(12) United States Patent
Liu

(10) Patent No.: US 9,763,532 B1
(45) Date of Patent: Sep. 19, 2017

(54) TAMPER RESISTANT HOT POT

(71) Applicant: Focus Products Group International, LLC, Lincolnshire, IL (US)

(72) Inventor: Rong Liu, Vernon Hills, IL (US)

(73) Assignee: GREENFIELD WORLD TRADE, INC., Ft. Lauderdale, FL (US)

( * ) Notice: Subject to any disclaimer, the term of this patent is extended or adjusted under 35 U.S.C. 154(b) by 309 days.

(21) Appl. No.: 14/626,523

(22) Filed: Feb. 19, 2015

(51) Int. Cl.
*A47J 27/21* (2006.01)

(52) U.S. Cl.
CPC ... *A47J 27/21041* (2013.01); *A47J 27/21166* (2013.01)

(58) Field of Classification Search
None
See application file for complete search history.

(56) References Cited

U.S. PATENT DOCUMENTS

| | | | | |
|---|---|---|---|---|
| 98,905 | A * | 1/1870 | Bacharach | E03D 13/00 4/311 |
| 151,359 | A * | 5/1874 | Davies | E05B 17/0045 16/86 A |
| 2,929,908 | A * | 3/1960 | Parker | A47J 27/21166 219/437 |
| 3,218,435 | A * | 11/1965 | Mandziak | A47J 27/21166 174/135 |
| 3,678,246 | A * | 7/1972 | Blachly | A47J 27/21058 219/437 |
| 3,715,567 | A * | 2/1973 | Mandziak | H01H 37/52 219/437 |
| 3,843,026 | A * | 10/1974 | Giovannozzi | E04G 21/20 222/389 |
| 3,870,858 | A * | 3/1975 | Schimke | A47L 15/4287 134/107 |
| 4,310,748 | A * | 1/1982 | Paulin | A47J 27/002 219/433 |
| 4,645,910 | A * | 2/1987 | Chhatwal | A47J 27/21075 219/437 |

(Continued)

FOREIGN PATENT DOCUMENTS

WO   2011018645 A2   2/2011
WO   2011101642 A2   8/2011

OTHER PUBLICATIONS

Jack L. Marcus Product Catalog, 8 pages (Publication prior to Feb. 19, 2015).

*Primary Examiner* — Thor Campbell
(74) *Attorney, Agent, or Firm* — Michael E. Dockins; Shumaker, Loop & Kendrick, LLP

(57) ABSTRACT

A hot pot has a body with an open top and an outward rim around a periphery adjacent to a bottom of the body. A heating element support supports a heating element and extends across the bottom of the body to define a liquid-receiving volume for the hot pot. The hot pot has a base with a side wall and a bottom panel extending across the sidewall. The side wall and bottom panel define a hollow interior for the base. The side wall has an outward lip extending around the side wall opposite the bottom panel. The side wall lip abuts the body outwardly extending rim. The hot pot further has a security ring extending around the side wall lip and the body outward rim. The security ring is fixed to the hot pot in such a way as to destroy structural integrity of the hot pot upon its removal.

19 Claims, 5 Drawing Sheets

(56) References Cited

U.S. PATENT DOCUMENTS

| | | | | |
|---|---|---|---|---|
| 4,860,038 A * | 8/1989 | Thatcher | G02B 23/22 | 348/81 |
| 5,048,881 A * | 9/1991 | Renfro | G09F 3/0352 | 215/274 |
| 5,328,604 A * | 7/1994 | Drori | B01D 29/114 | 210/232 |
| 5,914,063 A * | 6/1999 | Taylor | A47J 27/21041 | 219/436 |
| 6,121,586 A * | 9/2000 | Taylor | A47J 27/21041 | 219/436 |
| 6,283,625 B2 * | 9/2001 | Frankel | A47J 43/0716 | 366/146 |
| 6,377,750 B1 * | 4/2002 | Scott | A47J 27/21041 | 126/348 |
| 6,874,641 B2 * | 4/2005 | Clary | B01D 29/21 | 134/138 |
| 7,615,724 B2 * | 11/2009 | Labelle | A47J 27/21175 | 219/429 |
| 8,137,545 B2 * | 3/2012 | Nibler | C02F 1/001 | 210/167.12 |
| 8,467,669 B2 * | 6/2013 | Widanagamage | A47J 27/2105 | 119/229 |
| 8,606,093 B2 * | 12/2013 | Montanaro | B23K 26/103 | 219/121.64 |
| 9,194,493 B2 * | 11/2015 | Richiuso | F16B 2/08 | |
| 2008/0029504 A1 * | 2/2008 | Labelle | A47J 27/21175 | 219/438 |
| 2008/0098905 A1 * | 5/2008 | Steiner | A47J 43/0716 | 99/451 |
| 2008/0317449 A1 * | 12/2008 | Labelle | A47J 27/21166 | 392/444 |
| 2010/0158489 A1 * | 6/2010 | Siu | A47J 27/2105 | 392/444 |
| 2010/0224618 A1 * | 9/2010 | Lin | A47J 36/2483 | 219/438 |
| 2011/0023703 A1 * | 2/2011 | Radowitz | B60T 17/088 | 92/63 |
| 2014/0151359 A1 * | 6/2014 | Slot | A47J 27/21041 | 219/438 |

* cited by examiner

TAMPER RESISTANT HOT POT

BACKGROUND AND SUMMARY

The following disclosure relates to a tamper resistant hot pot. In particular, the disclosure relates to a hot pot that may be used in institutional environments, such as prisons, detention facilities, or other like institutions, where there is a risk of a user tampering with the hot pot and creating an unsafe condition for institutional personnel and/or the user.

DETAILED DESCRIPTION

Figure 5:
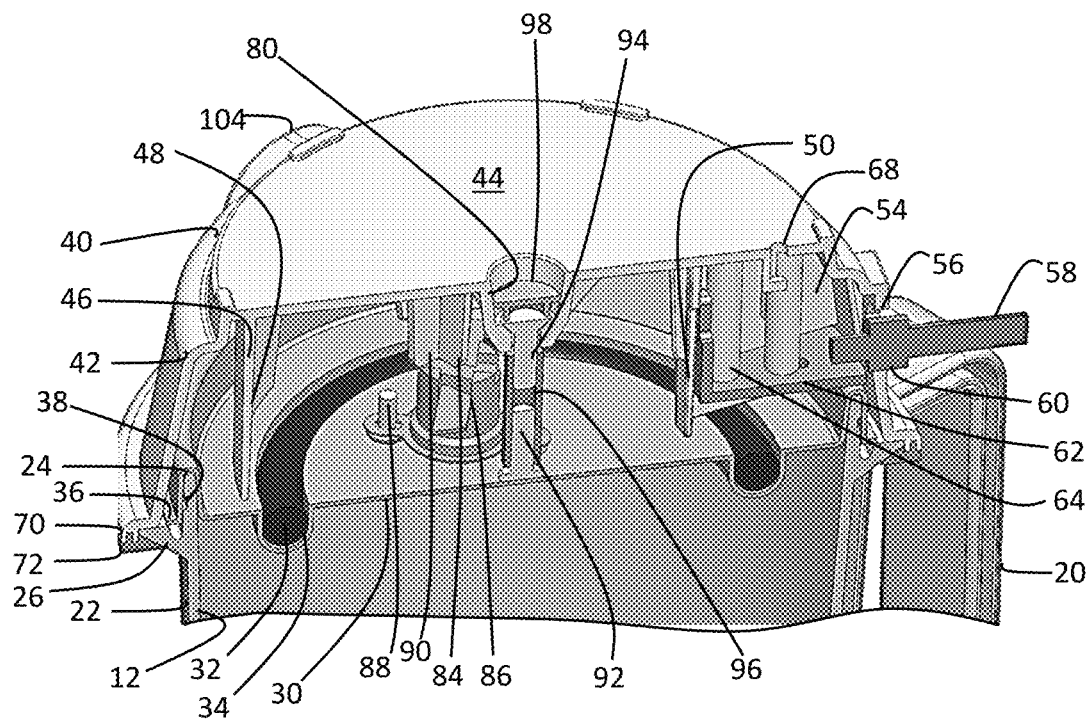
FIG. 5 shows a partial cross-sectional view of the hot pot showing an interior of the base and additional detail of the heating element.
Figure 6:
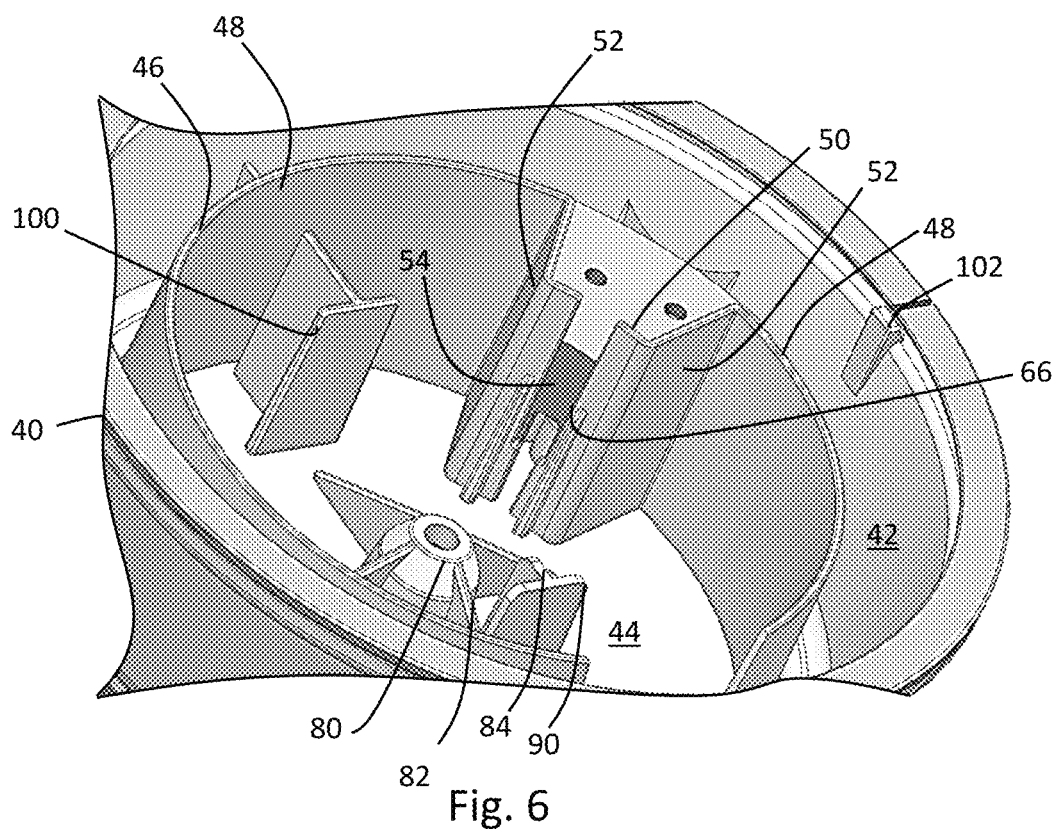
FIG. 6 shows a top view into an interior of a base of the hot pot with a heating element support and a body of the hot pot removed to show additional detail of the interior compartment formed by the base.

The hot pot 10 comprises a body 12. The body is generally a cylindrical member with an open top 14. The body 12 may have a spout 16 at the top 14 to facilitate the pouring of liquids from the body of the hot pot. The body 12 may be provided with a lid 18 that seals over the open top 14, and may adjustably seal the spout 16 to regulate the flow of the liquid therefrom. The lid 18 may releasably press fit into the opening of the top 14 of the body. In the alternative, the lid may be removably connectable, i.e., via threading, to the top of the body. The body 12 may have a handle 20 projecting from its outer diameter surface to allow a user the ability to grip and pour the hot pot. The body 12 may have a bottom 22 opposite the top 14. The bottom 22 may have a bottom peripheral edge 24 defining the bottom of the body. The body 12 may be formed with an outward extending rim 26 adjacent the bottom of the body. The outward extending rim 26 may project from the body at an axial distance from a bottom peripheral edge 24 of the body. For instance, as best shown in FIG. 5, the body 12 has a bottom peripheral edge 24 which extends axially beyond the point where the outward extending rim 26 projects radially from the body.

A heating element support 30 may extend across the body 12 at or adjacent to the bottom 22 of the body. The heating element support 30 supports a heating element 32. The heating element 32 may be disposed in a channel 34. The channel 34 may present itself as a raised portion projecting into the volume defined by the body 12. An outer peripheral edge 36 of the heating element support may be shaped to cooperate with the bottom peripheral edge 24 of the body. For instance, the outer peripheral edge 36 of the heating element support 30 may be crimped or clamped around the bottom edge 24 of the body 12 thereby attaching the body and the heating element support together. The bottom 22 of the body 12 may have grooves 38 or other features to allow such connections. The body and the heating element support may also be attached by other means including ultrasonic welding, tack or spot welding, or adhesive. The outer peripheral edge 36 of the heating element support 30 may extend to an area adjacent to but not interfering with the outwardly extending rim 26 of the bottom of the body 12.

A base 40 supports the body 12 and the heating element support 30. The base 40 comprises a generally cylindrical member with an annular side wall 42 and a bottom plate 44. The bottom plate 44 extends across the annular side wall 42 to define an interior volume of the base. Components for operating the hot pot may be disposed in the interior of the base 40. The base 40 may have an inner wall 46 formed adjacent to the side wall 42 in the interior of the base. The inner wall 46 may project from the bottom plate 44. The inner wall 46 and side wall 42 may support the heating element support 30. The inner wall 46 being spaced from the side wall 42 provides double wall protection for components disposed in the interior of the base and gives added strength to the base 40, making it more difficult to separate base from body by pulling electrical cord. The inner wall 46 may have a first portion 48 in general close proximity to the side wall, and a second portion 50 radially spaced from the outer portion. Radial wall portions 52 may extend between the first and second inner wall portions 48,50 to define a power cord knot compartment 54. The material forming the side wall 42, inner wall 46, and the bottom plate 44 may be of a sufficient light transmissive material to allow viewing of the hollow interior of the base. For instance, the base 40 may be made from a material that is translucent or transparent. Such material would allow viewing of the contents of the base to determine whether contraband was contained therein.

An aperture 56 formed in the sidewall may communicate with the power cord knot compartment 54. A power cord 58 may extend through the aperture 56 in the sidewall and into the power cord knot compartment 54. A strain relief 60 may be provided on the power cord 58 in the aperture 56 to secure the power cord to the side wall 42. To provide additional support for the power cord 58, the power cord may be anchored to the base 40 in the power cord knot compartment 54. The power cord knot compartment 54 may have a cover 62. The cover 62 may be supported in the interior by the inner wall radial wall portions 52 and the inner wall second portion 50. Projections 64 may extend from the base bottom plate 44 into the power cord knot compartment 54. The projections 64 may form a mounting surface for the cover 62. The projections 64 may have screw holes formed therein to allow the power cord knot compartment cover 62 to be anchored to the projections with mechanical fasteners. Together the strain relief 60 disposed in the aperture 56 of the side wall 42 and the anchor provided by the power cord knot compartment 54 may allow the power cord to be anchored to the base reliably and securely. The cover 62 may inhibit tampering with the power cord 58. The inner wall second portion 50 may have a gap 66 formed therein so that leads (not shown) extending from the power cord 58 may be directed to the heating element 32 of the heating element support 30. A water or condensation drain 68 may be formed in the power cord knot compartment 54 adjacent to a cylindrical projection 64. With the water drain 68 in the power cord knot compartment 54, any attempted access to the hollow interior of the base through the water drain may be more difficult as the power cord knot compartment in effect forms a labyrinth seal for the water drain. The handle 20 on the body 12 may be located angularly offset (for instance, about 45 degrees) from the power cord 58 and the power cord compartment 54 rather than in a parallel configuration to limit the ability to create leverage when using the handle to pull the electric cord in attempting to dislodge the base 40 from the body 12.

The base side wall 42 may have an outward extending lip 70 projecting radially from an outer periphery of the side wall at an upper-most portion of the side wall. The side wall lip 70 may be arranged to abut the body outward extending rim 26. The side wall lip 70 may be crimped or mechanically connected with the body outward extending rim 26. A security ring 72 may be provided around the outward extending rim and the sidewall lip. The security ring 72 may cover all or a portion the outward extending rim 26 and all or a portion of the side wall lip 70. The security ring 72 may be ultrasonically welded or otherwise mechanically attached to the hot pot around the side wall lip 70 and the body outward extending rim 26. The security ring 72 may be configured to prevent tampering with the connection between the base and the body. The security ring 72 may be brightly colored (for instance, orange or yellow, or fluorescent variations thereof) to provide a visual indication whether it has been tampered with or otherwise altered. The security ring 72 may be attached to the hot pot in such a manner that attempted removal of the security ring may decrease or prevent normal functionality of the hot pot. For instance, the security ring may be attached to the hot pot such that removal of the security ring from the hot pot may render the hot pot inoperative, e.g., result in damage to the side walls of the base, and/or the body, such that the hot pot will not be able to contain a liquid received therein.

Figure 1:
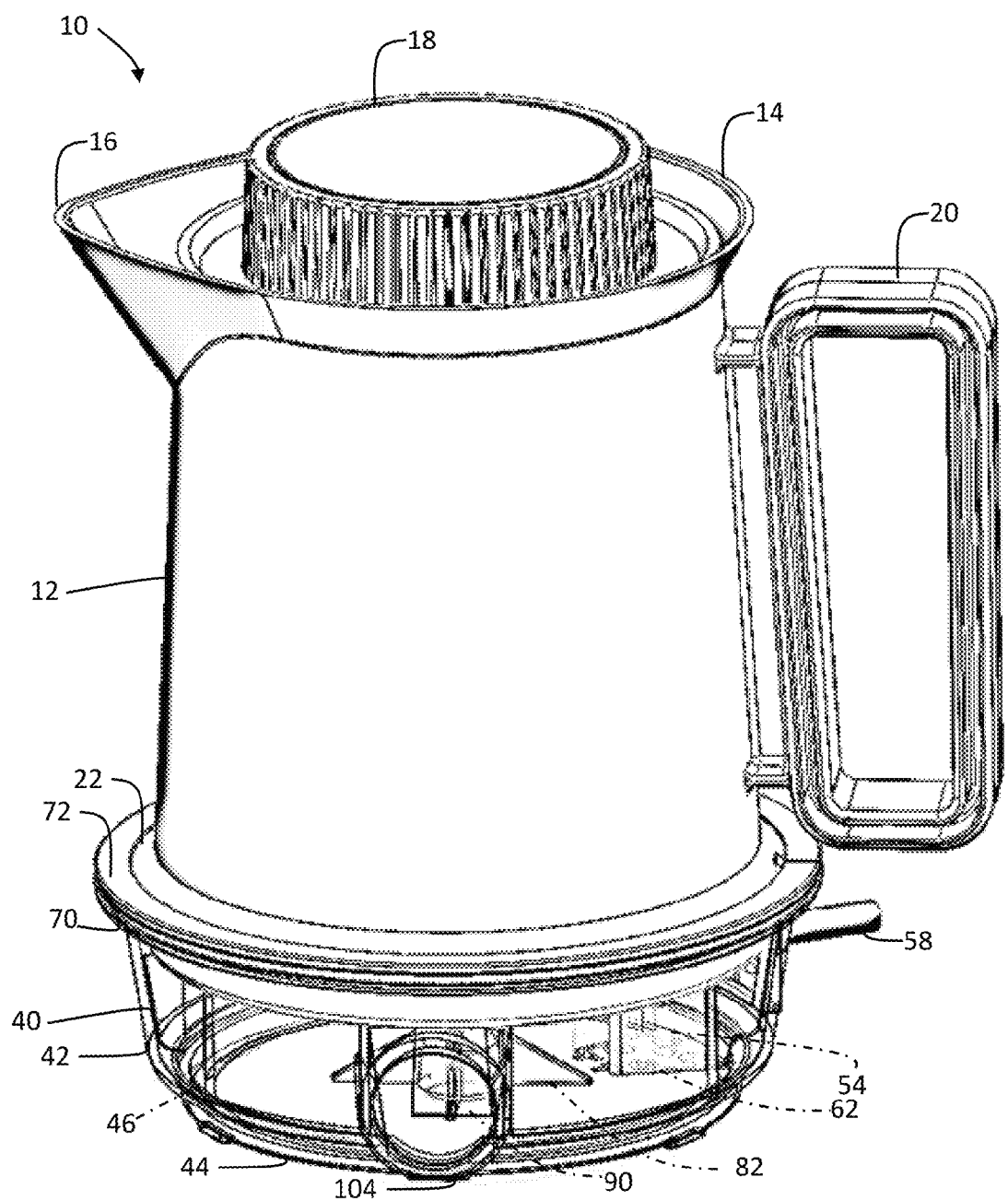
FIG. 1 is a perspective view of a hot pot.
Figure 2:
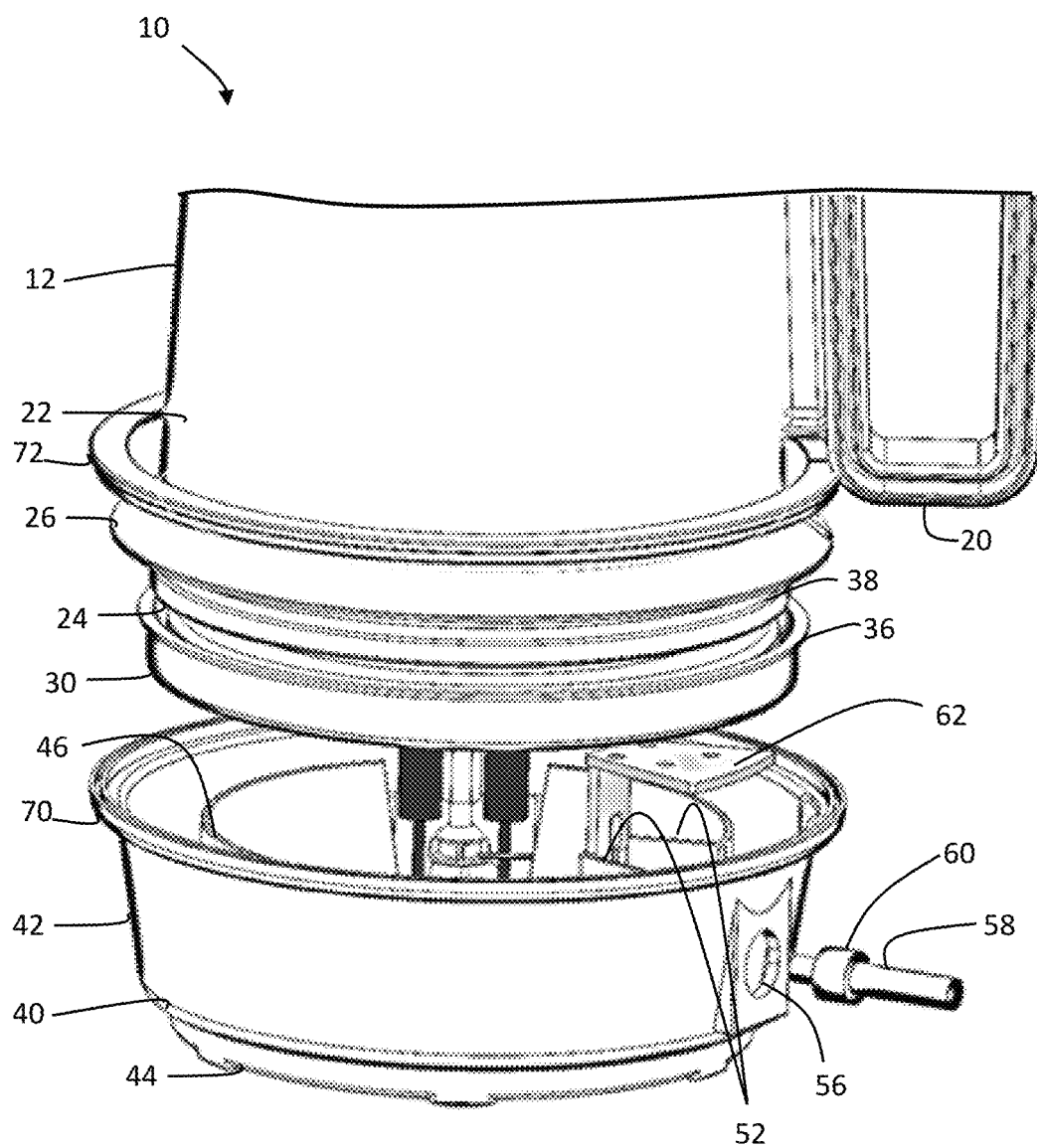
FIG. 2 is an exploded view of the hot pot of FIG. 1 with the base detached from a body to show a heating element and other components of disposed in a hollow interior of the base.
Figure 3:
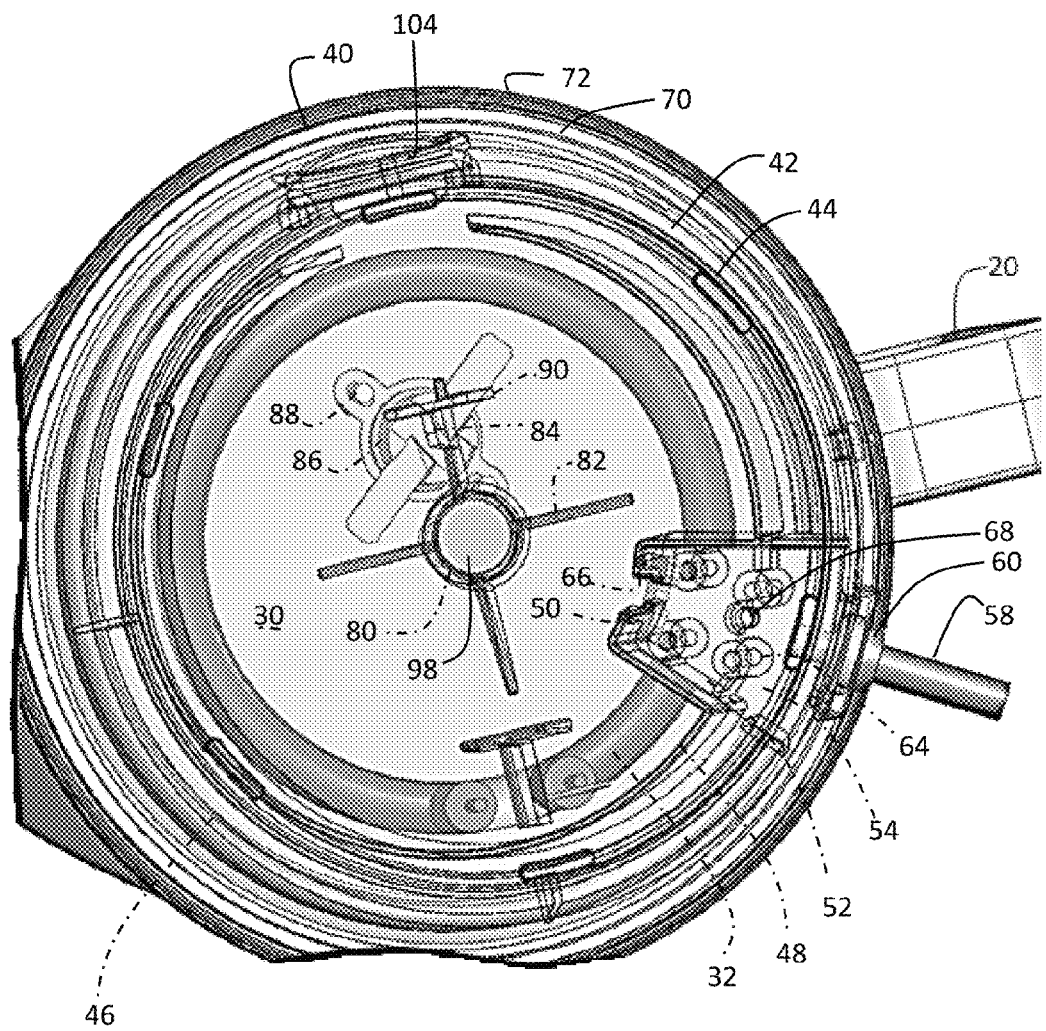
FIG. 3 shows a bottom view of a base of the hot pot.
Figure 4:
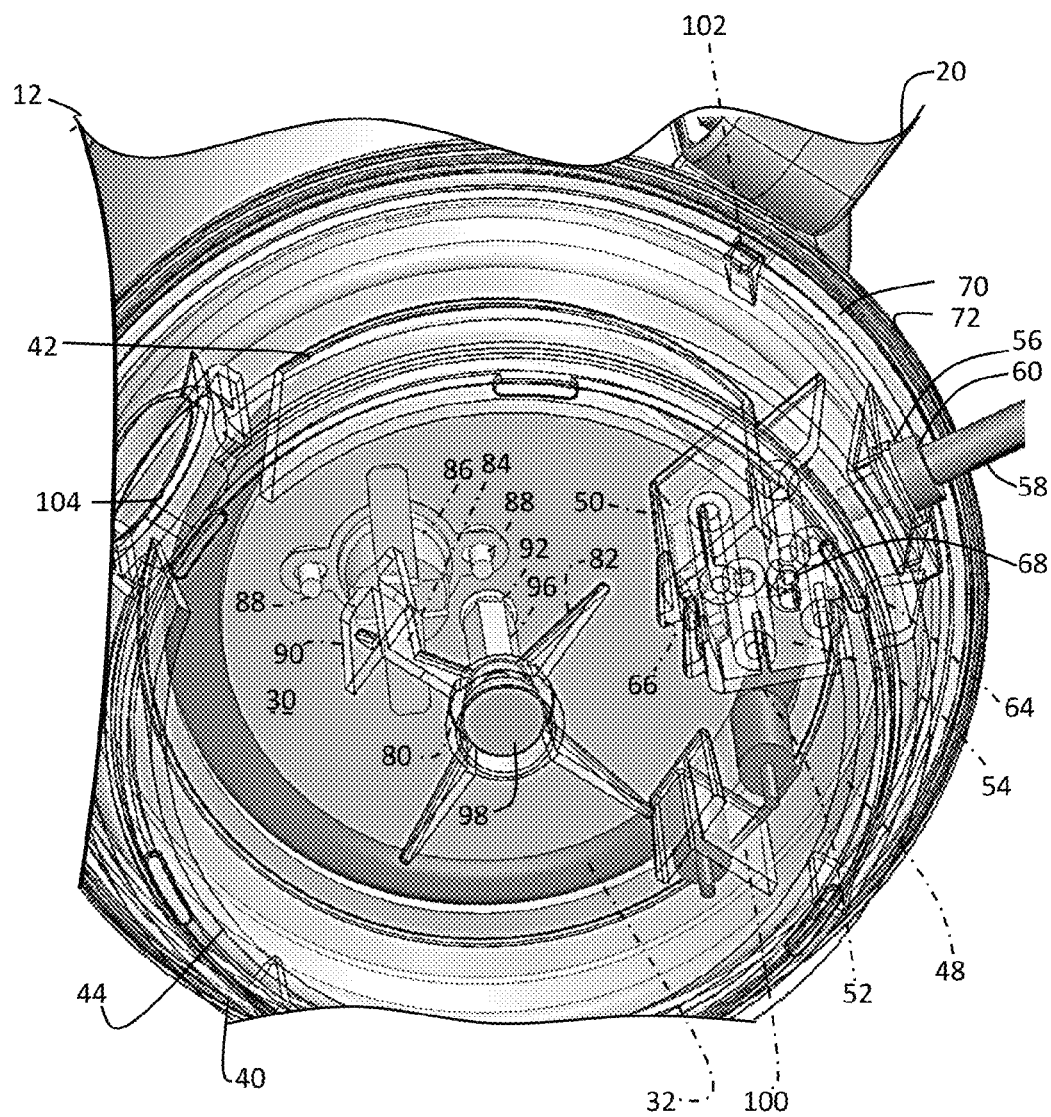
FIG. 4 shows an alternate bottom view of the base of the hot pot.

The base 40 may have a center boss 80 in the bottom plate 44. The center boss 80 may include a radial web 82 extending therefrom across the bottom plate and projecting inward into the hollow interior of the base. One or more radial webs may be provided. A radial web 82 may be formed with a finger 84 on its distal end projecting axially into the hollow interior of the base. The finger 84 may be sized and dimensioned to accommodate a thermostat element 86 disposed in the hollow interior of the base. As best shown in FIG. 4, the thermostat element 86 is disposed between the heating element support 30 and the finger 84. To provide further support for the thermostat element 86, the thermostat element 86 may be mounted to the heating element support 30 with mechanical fasteners 88. The finger 84 may be sized and dimensioned to press fit the thermostat element 86 between the finger and the heating element support 30. To provide further support for the thermostat element 86, a cross rib 90 may be provided on the finger 86. The cross rib 90 may extend across the thermostat element 86 in a direction generally transverse to the web 82 and the finger 84. As shown in FIG. 3, the cross rib 90 press fits against the thermostat element 86 and provides additional support for the thermostat element 86 in the hollow interior of the base, and deters alteration of temperature. Also, as shown in the drawings, the thermostat element 86 is located away from the water drain 68 and the power cord compartment 54 to reduce the potential of gaining access to the thermostat element via the water drain.

A mechanical fastener may extend through the base center boss 80 to the heating element support 30 to maintain structural integrity for the hot pot. The mechanical fastener may comprise first and second threaded portions 92,94 which cooperate with a threaded bushing 96 in the hollow interior of the base. The first threaded portion 92 may comprise a threaded projection extending from the heating element support 30 to engage one side of the threaded bushing 96. The second threaded portion 94 may comprise a threaded member directed through the center boss 80. The second threaded portion 94 extend may be configured to prevent its removal. The head of the second threaded portion 94 may have a unidirectional drive that prevents removal of the second threaded portion. The head may also be coated with a material to prevent second threaded portion from being removed. Additionally, the head of the second threaded portion 94 may be disposed in the boss to prevent its removal. The boss 80 may have a recessed counter bore and the head of the second threaded screw portion 94 may be disposed in the recessed counter bore, and a cover 98 may extend across the center boss and be spaced apart from the head of second threaded portion 94 in the recessed counter bore. The cover 98 may be ultrasonically welded to the base 40 or may be attached to the base in such a way as to prevent access to the center boss and/or head of the second threaded portion 94. The cover 98 or coating may be brightly colored to provide a visual indication of whether it has been tampered with or otherwise altered.

The base may have other web members 100 to provide structural integrity for the base and hot pot, and tabs 102 to faillite assembly of the base 40, heating element support 30 and body 12. The base may also have features 104 to allow locating switching and indicator lights.

The hot pot as described herein may be used to warm up food. However, the hot pot has features that may limit the ability of a user to tamper with the hot pot, for instance, the temperature limiting devices (i.e. the thermostat element and the thermal cut-off). The hot pot security ring may limit the ability of a user to gain unauthorized access to the hollow interior of the base from between the body and the base. The combination of the power cord sidewall aperture strain relief and the power cord knot compartment anchor may provide additional safeguards for tampering with the power cord. The combination of the power cord sidewall aperture strain relief and the power cord knot compartment anchor may limit the ability of a user to gain access to the interior of the hot pot from the power cord connection. The double wall construction of the base also assists in preventing access to the internal temperature limiting devices of the hot pot.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A hot pot comprising:
   a body configured to hold liquid, the body having an open top and a radially outwardly extending rim formed around an outer periphery of the body adjacent to a bottom of the body;
   a heating element support at the bottom of the body, the heating element support supporting a heating element and extending across the bottom of the body to define a volume configured to receive a liquid for the hot pot;
   a base having a side wall and a bottom panel extending across the sidewall, the side wall and bottom panel defining a hollow interior for the base, the side wall having a radially outwardly extending lip formed around an outer periphery of the side wall opposite the bottom panel, the lip abutting the rim; and a security ring extending around the lip and the rim, the security ring being fixed to the hot pot in such a way as to destroy structural integrity of the hot pot upon its removal.

2. The hot pot of claim 1 wherein the base is formed of a light transmissive material sufficient to allow the interior of the base to be viewed.

3. The hot pot of claim 1 wherein the ring is brightly colored.

4. The hot pot of claim 1 wherein the ring is ultrasonically welded to the base.

5. The hot pot of claim 1 wherein the lip and the rim are clamped together.

6. A hot pot comprising:
a body configured to hold a liquid for the hot pot;
a heating element support extending across a bottom of the body, the heating element support supporting a heating element;
a base having a side wall and a bottom panel extending across the sidewall, the side wall and bottom panel defining a hollow interior for the base, the side wall in part supporting the heating element compartment, the base having an arcuate inner wall radially inward of the sidewall and extending from the bottom panel, the base having spaced apart radial walls extending radially inwardly from the inner wall, the radial walls defining a power cord knot compartment, the power cord knot compartment having a cover; and
a power cord for the hot pot extending through the side wall through an aperture and a strain relief disposed within the aperture, and extending into the power cord knot compartment, the power cord being secured to the base in the power cord knot compartment, with leads of the power cord extending from the power cord knot compartment to the heating element.

7. The hot pot of claim 6 wherein the bottom panel of the base has projections extending into the base interior that form a mount for the power cord knot compartment cover.

8. The hot pot of claim 6 wherein the inner wall has a first portion extending through the base interior generally adjacent to the sidewall and a second portion extending radially inward from the first portion defining the power cord knot compartment.

9. The hot pot of claim 6 wherein the side wall and bottom panel are formed of a light transmissive material sufficient to allow the interior of the base to be viewed.

10. A hot pot comprising:
a body configured to hold a liquid for the hot pot;
a heating element support extending across a bottom of the body;
a base having a side wall and a bottom panel extending across the sidewall, the side wall and bottom panel defining a hollow interior for the base, the side wall in part supporting the heating element compartment, the bottom panel having a center boss configured to accept a mechanical fastener for operatively securing the base to the heating element support, the center boss having a web extending outwardly and radially therefrom, the web having a finger projecting into the hollow interior at a distal end thereof, the finger being dimensioned to fix a thermostat element between the heating element support and the finger, the finger including a cross rib extending transverse to the finger and the web; and
a mechanical fastener extending through the boss securing the heating element support to the bottom panel, wherein the heating element support supports the heating element.

11. The hot pot of claim 10 wherein the mechanical fastener is mounted to the boss in such a way as to destroy structural integrity of the hot pot upon its removal.

12. The hot pot of claim 10 wherein the thermostat is secured to the heating element support with mechanical fasteners.

13. The hot pot of claim 10 wherein the thermostat is fixed with a press fit between the projection and the heating element support.

14. The hot pot of claim 10 further comprising a cover for the mechanical fastener.

15. The hot pot of claim 14 wherein the cover is brightly colored.

16. The hot pot of claim 10 further comprising an inner wall radially inward of the sidewall.

17. The hot port of claim 16 wherein the inner wall supports the heating element support.

18. The hot pot of claim 16 wherein the thermostat element is in the interior of base defined by the inner wall.

19. The hot pot of claim 10 wherein the side wall and bottom panel is formed of a light transmissive material sufficient to allow the interior of the base to be viewed.

* * * * *